United States Patent
Carpenter et al.

(10) Patent No.: US 10,264,322 B2
(45) Date of Patent: Apr. 16, 2019

(54) UNIFIED PLAYLIST

(71) Applicant: MobiTV, Inc., Emeryville, CA (US)

(72) Inventors: Cory Carpenter, Walnut Creek, CA (US); Fidel Zawde, Oakland, CA (US); Curtis Calhoun, El Sobrante, CA (US)

(73) Assignee: MobiTV, Inc., Emeryville, CA (US)

( * ) Notice: Subject to any disclaimer, the term of this patent is extended or adjusted under 35 U.S.C. 154(b) by 0 days.

(21) Appl. No.: 14/625,548

(22) Filed: Feb. 18, 2015

(65) Prior Publication Data

US 2016/0241922 A1   Aug. 18, 2016

(51) Int. Cl.
*H04N 5/445* (2011.01)
*H04N 21/482* (2011.01)
*H04N 21/2665* (2011.01)
*H04N 21/262* (2011.01)
*H04N 21/4147* (2011.01)
*H04N 21/6543* (2011.01)
*H04N 21/433* (2011.01)
*H04N 21/61* (2011.01)

(52) U.S. Cl.
CPC ..... *H04N 21/4825* (2013.01); *H04N 21/2665* (2013.01); *H04N 21/26258* (2013.01); *H04N 21/4147* (2013.01); *H04N 21/4334* (2013.01); *H04N 21/6125* (2013.01); *H04N 21/6543* (2013.01)

(58) Field of Classification Search
CPC ... H04N 2/84; H04N 5/44543; H04N 21/4622
USPC .................. 725/48–51, 60, 61; 709/218, 219
See application file for complete search history.

(56) References Cited

U.S. PATENT DOCUMENTS

| | | | | |
|---|---|---|---|---|
| 7,444,599 B1* | 10/2008 | Chaudhri | ............. | G06F 3/0485 |
| | | | | 715/815 |
| 7,962,947 B2* | 6/2011 | Kulakowski | ........ | H04L 12/5895 |
| | | | | 725/109 |
| 8,073,492 B2* | 12/2011 | Karaoguz | ............. | H04W 88/06 |
| | | | | 455/550.1 |
| 8,656,431 B2* | 2/2014 | Cavicchia | ............. | H04N 7/163 |
| | | | | 725/47 |
| 8,973,036 B2* | 3/2015 | Nagaraja | ............ | H04N 5/44543 |
| | | | | 725/39 |
| 8,997,154 B2* | 3/2015 | Ansari | ............... | H04N 7/17318 |
| | | | | 707/706 |
| 9,639,634 B1* | 5/2017 | Greene | ............ | G06F 17/30053 |
| 2002/0154892 A1* | 10/2002 | Hoshen | .................. | H04N 7/163 |
| | | | | 386/213 |
| 2003/0233656 A1* | 12/2003 | Sie | ..................... | H04N 5/44543 |
| | | | | 725/46 |

(Continued)

*Primary Examiner* — Annan Q Shang
(74) *Attorney, Agent, or Firm* — Kwan & Olynick LLP (57) ABSTRACT

Techniques and mechanisms described herein relate to generating a unified playlist for media content originating from different content providers. According to various embodiments, a connection request from a media aggregation system is sent to an over-the-top (OTT) content service provider. A connection is established between the media aggregation system and the OTT content service provider. A connection is also established between the media aggregation system and a cable/satellite/terrestrial (CST) content service provider. Program information from the OTT content service provider and program information associated with the CST content service provider are combined to generate a unified playlist at the media aggregation system.

20 Claims, 10 Drawing Sheets

(56) References Cited

U.S. PATENT DOCUMENTS

| | | | |
|---|---|---|---|
| 2005/0081138 A1* | 4/2005 | Voss | G06F 17/30817 715/200 |
| 2006/0267995 A1* | 11/2006 | Radloff | G11B 27/105 345/530 |
| 2007/0101394 A1* | 5/2007 | Fu | G11B 27/105 725/134 |
| 2008/0141172 A1* | 6/2008 | Yamamoto | G06F 3/0482 715/835 |
| 2010/0031162 A1* | 2/2010 | Wiser | G06Q 30/0255 715/747 |
| 2010/0138868 A1* | 6/2010 | Sie | H04N 5/44543 725/46 |
| 2010/0293048 A1* | 11/2010 | Singolda | G06Q 30/02 705/14.43 |
| 2012/0104096 A1* | 5/2012 | Lee | B01L 3/5023 235/437 |
| 2013/0174035 A1* | 7/2013 | Grab | H04N 21/4316 715/716 |
| 2013/0212477 A1* | 8/2013 | Averbuch | H04N 21/4725 715/719 |
| 2014/0006951 A1* | 1/2014 | Hunter | H04H 60/31 715/719 |
| 2014/0040273 A1* | 2/2014 | Cooper | G06F 17/30014 707/741 |
| 2014/0189139 A1* | 7/2014 | Cheng | H04L 65/60 709/231 |
| 2015/0026728 A1* | 1/2015 | Carter | H04N 21/235 725/42 |
| 2015/0350707 A1* | 12/2015 | Reynolds | H04N 21/2668 725/34 |
| 2016/0029057 A1* | 1/2016 | Wickenkamp | H04N 21/252 725/14 |
| 2016/0119675 A1* | 4/2016 | Voth | H04N 21/4532 725/14 |
| 2016/0119678 A1* | 4/2016 | Odryna | H04N 21/4622 725/49 |
| 2016/0142760 A1* | 5/2016 | Son | H04N 21/47202 725/49 |

* cited by examiner

UNIFIED PLAYLIST

TECHNICAL FIELD

The present disclosure relates to generating and using a unified playlist for media content originating from different content providers.

DESCRIPTION OF RELATED ART

Conventional systems typically require users to access separate places in an application (app) or service to browse live content versus on-demand content and content from different providers. Consequently, users can only browse or search a subset of the media available to them (e.g. live or on-demand) in any particular application or service. Existing over-the-top (OTT) streaming services such as Hulu, Vudu, etc. allow users to save movies or TV shows that they want to watch later to a list (often called a queue or watchlist). When a user adds a title to a watchlist that is not yet available via their OTT service, the user is often notified when it does become available (e.g. when new episodes are available from shows in the user's watchlist). Existing cable/satellite/terrestrial (CST) services, such as cable services, often offer a tier of service that allows a user to record movies or episodes from TV shows so that they can watch them on demand after they aired on live TV ("DVR"). This is effectively the same as the watchlist described above but the problem is that users who utilize both OTT and DVR services have to use two different services to do the same thing. The problem is compounded when there are multiple OTT providers and multiple DVR providers. Although some separate applications may allow a user to create a list of favorites across services, the user must launch separate services to play the media content included such a list. Accordingly, it is desirable to provide improved mechanisms for organizing, managing, and accessing media content.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Techniques and mechanisms described herein relate to generating a unified playlist for media content originating from different content providers. According to various embodiments, a connection request from a media aggregation system is sent to an over-the-top (OTT) content service provider. A connection is established between the media aggregation system and the OTT content service provider. A connection is also established between the media aggregation system and a cable/satellite/terrestrial (CST) content service provider. Program information from the OTT content service provider and program information associated with the CST content service provider are combined to generate a unified playlist at the media aggregation system.

Example Embodiments

Conventional mechanisms for viewing media content typically include accessing live streams via cable/satellite/terrestrial (CST) systems or on-demand content via over-the-top (OTT) systems. CST systems, such as cable services, allow users to view live content and often offer a tier of service that allows users to record movies or episodes from TV shows for later viewing using a digital video recorder ("DVR"). OTT streaming services, such as Hulu, Vudu, etc., allow users to view content on-demand and save movies or TV shows that they want to watch later to a list, such as a queue or watchlist. As new episodes or content related to the saved list become available, the OTT may notify users that the new content is ready to view.

However, in conventional systems, users must access separate places in an app or service to browse live content (e.g. CST content) versus on-demand content (e.g. OTT content). For instance, a user may need to launch a DVR to watch CST content that has been recorded and separately launch an OTT service such as Hulu to view on-demand content. Accordingly, users typically have at least two separate watchlists in at least two separate places. Consequently, users can only browse or search a subset of the media available to them (i.e. either live or on-demand) in any particular application or service.

Although users can only create a playlist or watchlist within an individual service or application, some additional applications allow a user to create a list of favorites across services. However, such lists do not allow users to play the content through this list. Instead, the lists are mainly informational, and users must still access content through separate CST or OTT services.

Accordingly, the present disclosure provides improved mechanisms for organizing, managing, and accessing media content. In particular, various embodiments of the present disclosure include a media aggregation system that generates a unified playlist across one or more OTT content service providers and CST content service providers. This unified playlist can include movies, TV shows, recorded (DVR) live content, on-demand content, etc. all in one list. In some examples, this unified playlist can be both browsed and searched, and various filters can be applied to prune the search results. In addition, media content can be accessed and played through this playlist without the need to launch an additional application or service.

A particular benefit of this unified playlist is that users no longer need to access separate feeds to discover live and on-demand content. Furthermore, users no longer need to search live and on-demand content separately. In addition, with a unified playlist, users no longer have to use multiple tools or services to save and access movies and shows that they want to watch later. According to various embodiments, DVR functionality is merged into the unified playlist such that TV shows and movies are accessible from one location. In addition, a user can save live content to the same repository as on demand content for future viewing.

Another benefit of this unified playlist includes the ability to access media content directly through the unified playlist. In particular, a user can select and play content through the unified playlist without the need to launch a separate application or service. Even if the different pieces of content are accessible from different providers or repositories, a user is presented with the content from the unified playlist in a seamless experience.

Figure 1:
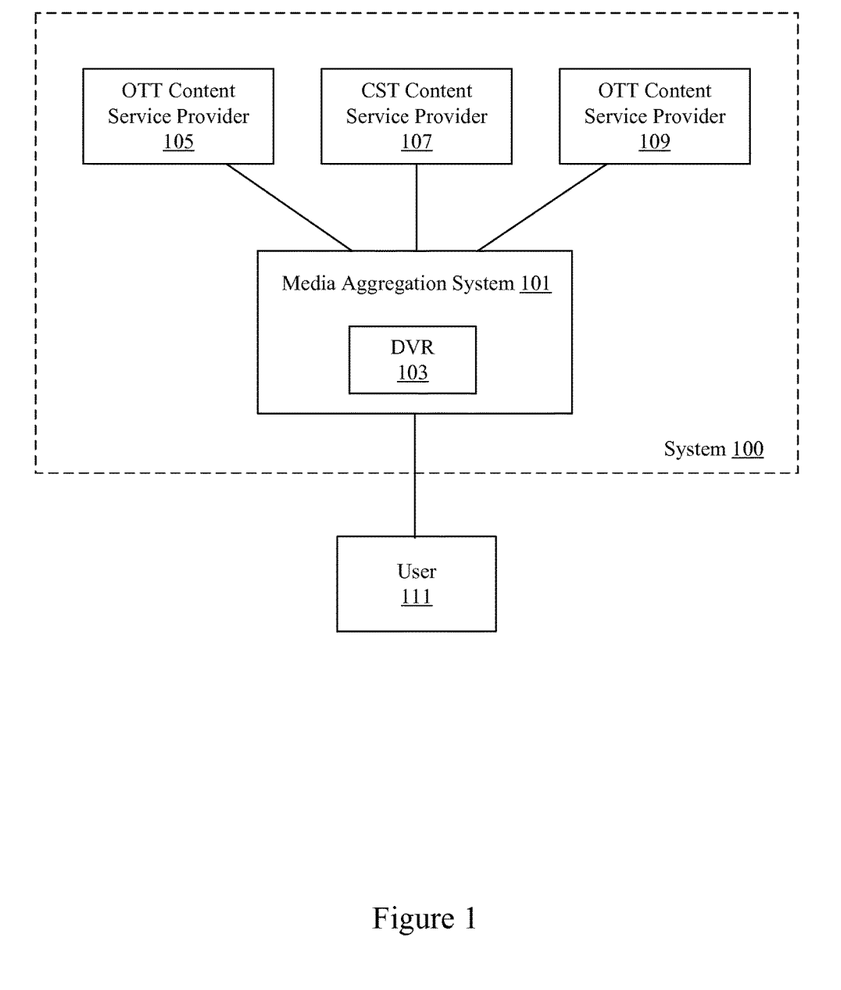
FIG. 1 illustrates an example of a system that can be used to generate a unified playlist.

With reference to FIG. 1, shown is one example of a system that can be used to generate a unified playlist. In the present embodiment, system 100 includes a media aggregation system 101 that can include a DVR 103. The media aggregation system 101 can be implemented as a tablet, mobile app, set top box, or other interface that provides a user 111 with access to media content. According to various embodiments, DVR 103 functionality is merged into the unified playlist such that TV shows and movies are accessible from one location. Any new episodes from shows in a user's playlist that air on live TV can be automatically recorded by a DVR and added to the unified playlist. When a user leaves or pauses a live episode from a show that is in their playlist, the playback location can be saved and the rest of the show can be recorded. According to various embodiments, a user can save live content to the same repository as on demand content for future viewing.

In the present example, the media aggregation system 101 can provide information and access to content from one or more service providers. As shown in the present example, media aggregation system 101 provides access to content from OTT content service provider 105, CST content service provider 107, and OTT content service provider 109. Although a particular configuration of OTT and CST content service providers are shown, any number of OTT and CST content service providers can be used without deviating from the scope of this disclosure.

According to various embodiments, the media aggregation system 101 can generate a unified playlist that combines watchlist information from each of the content service providers 105, 107, and 109. According to various embodiments, the unified playlist is stored in a program database or customized datastore for maintaining the unified playlist. For example, a unified playlist can include OTT content, cable content, and terrestrial content transmitted over the air. Example processes for generating unified playlists are described in more detail below with regard to FIGS. 2A and 2B. This unified playlist can allow the user 111 to browse and search content from all of the content service providers 105, 107, and 109 in one place. Examples of playlists are described in more detail with regard to FIGS. 5 and 6 below.

In some embodiments, media content can be played through the playlist provided by media aggregation system 101. As described in more detail below with regard to FIGS. 3A-3B and 4A-4B, media aggregation system 101 can provide access to the content without requiring the user to launch or access another application or service. For instance, the media aggregation system 101 can facilitate access to content from an OTT service provider without requiring the user to separately contact the OTT service provider application or service. In some examples, live content is automatically saved using a digital video recorder (DVR) 103 associated with the media aggregation system 101. This saved content, which may have originally aired through CST Content Service Provider 107, can be provided to the user 111 on-demand directly from the DVR 103 at the media aggregation system 101 without the need to access the CST content service provider 107.

According to various examples, media content can be selected by a user 111 to be played via media aggregation system 101. In some instances, the media aggregation system 101 may also automatically play content when the media aggregation system 101 is launched. More specifically, a panel on a user interface may play content automatically if the user doesn't select anything to view. This content may include shows or movies from the unified playlist, live TV, etc.

Figure 2A:
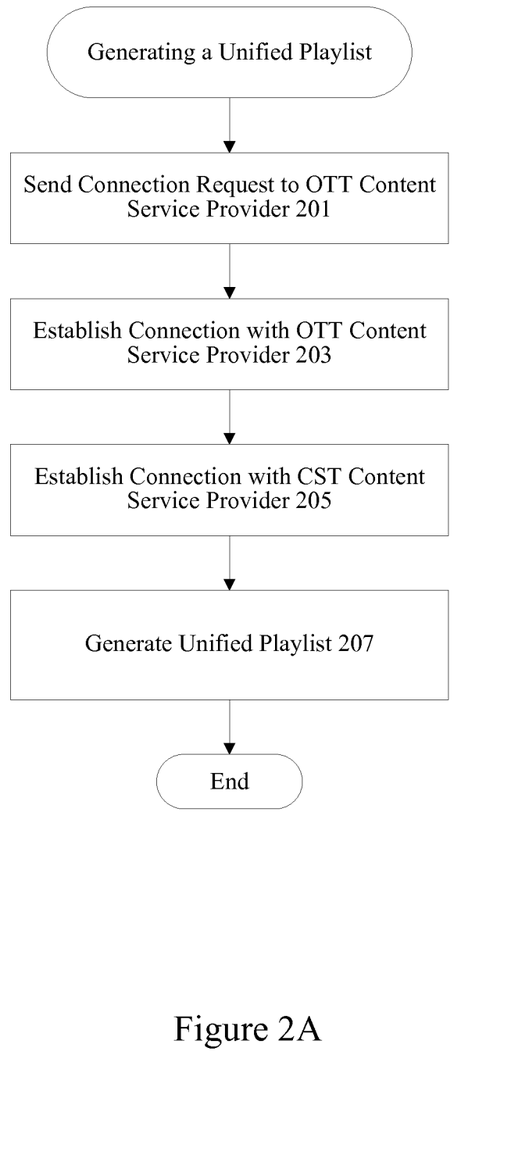
FIG. 2A illustrates one example of a process that can be used to generate a unified playlist.
Figure 2B:
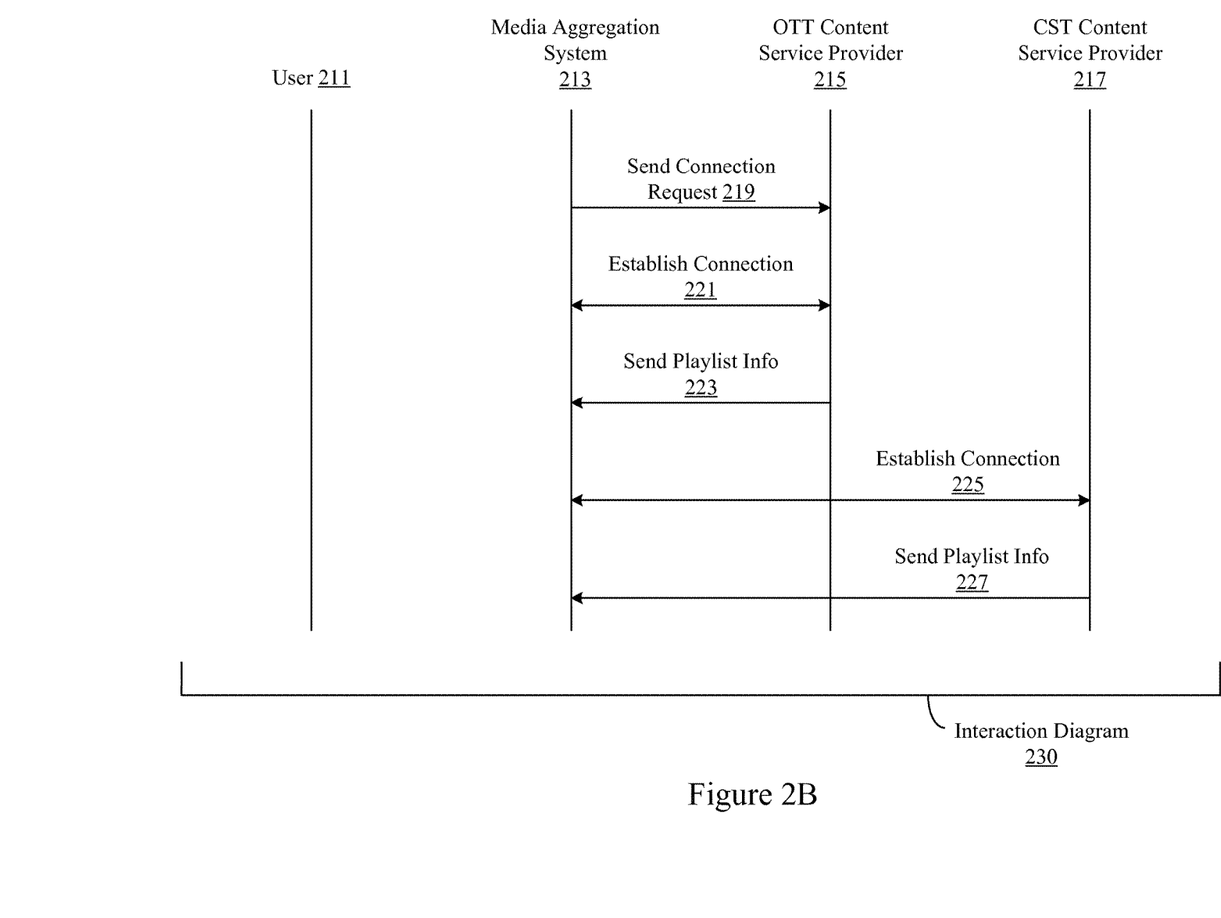
FIG. 2B illustrates one example of an interaction diagram showing a process used to generate a unified playlist.

FIGS. 2A and 2B provide examples of processes that can be used to generate a unified playlist. With particular reference to FIG. 2A, shown is one example of a process that can be used to generate a unified playlist. As described above with regard to FIG. 1, a unified playlist can be generated at a media aggregation system. This media aggregation system can gather information relating to watchlists, favorites, etc. from different content service providers and combine this gathered program information into a single unified playlist. In the present example, the media aggregation system sends a connection request to an OTT content service provider at 201. Next, the media aggregation system establishes a connection with the OTT content service provider at 203. The media aggregation system can then periodically gather information about a user's watchlists, favorites, etc. associated with the OTT content service provider. In some examples, the media aggregation system may request information from the OTT content service provider, and in other examples, the media aggregation system can gather information based on user inputs provided through the media aggregation system regarding OTT content.

In the present example, the media aggregation system then establishes a connection with the CST content service provider at 205. The media aggregation system can then periodically gather information about a user's watchlists, favorites, etc. associated with the CST content service provider. In some examples, the media aggregation system may request information from the CST content service provider, and in other examples, the media aggregation system can gather information based on user inputs provided through the media aggregation system regarding CST content. In addition, live content from the CST can be automatically saved using a digital video recorder (DVR) associated with the media aggregation system. Information about the content saved at the DVR can be included in the unified playlist in various examples.

Next, a unified playlist is generated at 207. In particular, the unified playlist is generated at the media aggregation system by combining program information from the OTT content service provider with program information associated with the CST content service provider. This unified playlist can include video on-demand content and live content, according to various embodiments. In addition, this unified playlist can include OTT content, cable content, and terrestrial content transmitted over the air. Other types of content and providers can also be included without deviating from the scope of this embodiment.

With reference to FIG. 2B, shown is one example of an interaction diagram showing a process used to generate a unified playlist. The present example shows a user 211, media aggregation system 213, OTT content service provider 215, and a CST content service provider 217 in the interaction diagram 230. In order to generate a unified playlist, media aggregation system 213 sends a connection request 219 to OTT content service provider 215. Next, a connection is established 221 between media aggregation system 213 and OTT content service provider 215. The OTT content service provider 215 then sends playlist information 223 to media aggregation system 213. In some examples, the OTT content service provider 215 can periodically send playlist information to the media aggregation system 213. In other examples, the media aggregation system 213 can request updates when needed from the OTT content service provider 215. In yet other examples (not shown), the media aggregation system 213 can collect playlist information based on user inputs, without the need to receive playlist information directly from the OTT content service provider 215. In some embodiments, the connection between the media aggregation system 213 and OTT content service provider 215 can be continuous, and in other embodiments, the connection can be intermittent.

In the present example, the media aggregation system 213 also establishes a connection 225 with CST content service provider 217. The CST content service provider 217 then sends playlist information 227 to media aggregation system 213. In some examples, the CST content service provider 217 can periodically send playlist information to the media aggregation system 213. In other examples, the media aggregation system 213 can request updates when needed from the CST content service provider 217. In yet other examples (not shown), the media aggregation system 213 can collect playlist information based on user inputs, without the need to receive playlist information directly from the CST content service provider 217. In some embodiments, the connection between the media aggregation system 213 and CST content service provider 217 can be continuous, and in other embodiments, the connection can be intermittent.

According to various embodiments, the media aggregation system 213 can combine playlist information received from the OTT content service provider 215 and the CST content service provider 217 to generate a unified playlist. Depending on the application, this unified playlist can be updated at various times such as periodically, when changes are made to any of the playlists, or when updated playlists are received at the media aggregation system 213. It should be noted that although the present interaction diagram 230 shows that media aggregation system 213 establishes a connection 221 with OTT content service provider 215 before establishing a connection 225 with the CST content service provider 217, the order of connection can be reversed within the scope of this example. Furthermore, any number of OTT content service providers or CST content service providers can be included. In addition, the present example shows that the media aggregation system 213 can generate a unified playlist without the need for any user 211 prompting or input. However, other examples can include interaction with the user 211, such as when the media aggregation system 213 detects input from the user 211, and consequently updates its unified playlist based on user inputs.

Although the present example shows only one OTT content service provider and one CST content service provider, any number of OTT or CST content service providers can be included. For instance, a second OTT content service provider can be included. A second connection request can be sent from the media aggregation system to the second OTT content service provider and a connection can be established between the media aggregation system and the second OTT content service provider. When playlist information associated with the second OTT content service provider is gathered, this playlist information can also be included in a unified playlist.

Figure 3A:
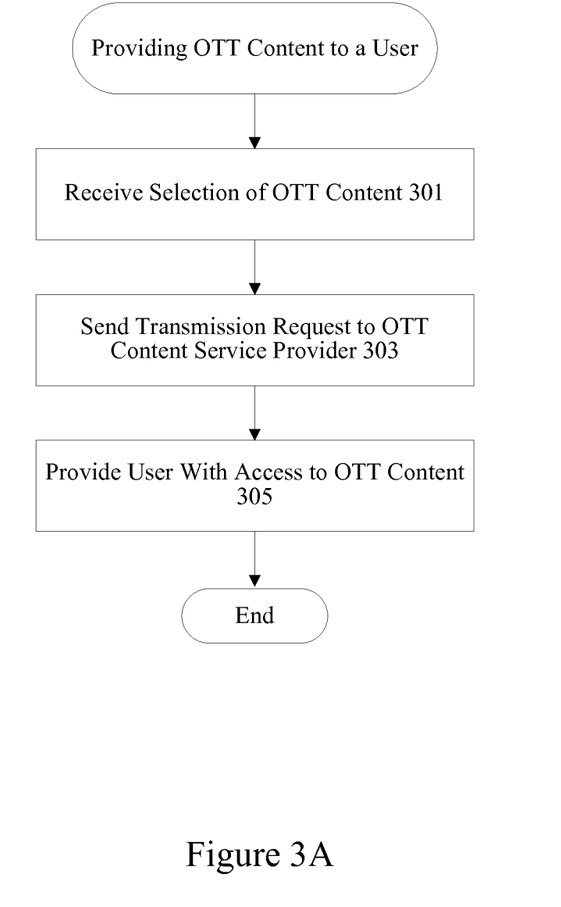
FIG. 3A illustrates one example of a process that can be used to provide over-the-top (OTT) content to a user.
Figure 3B:
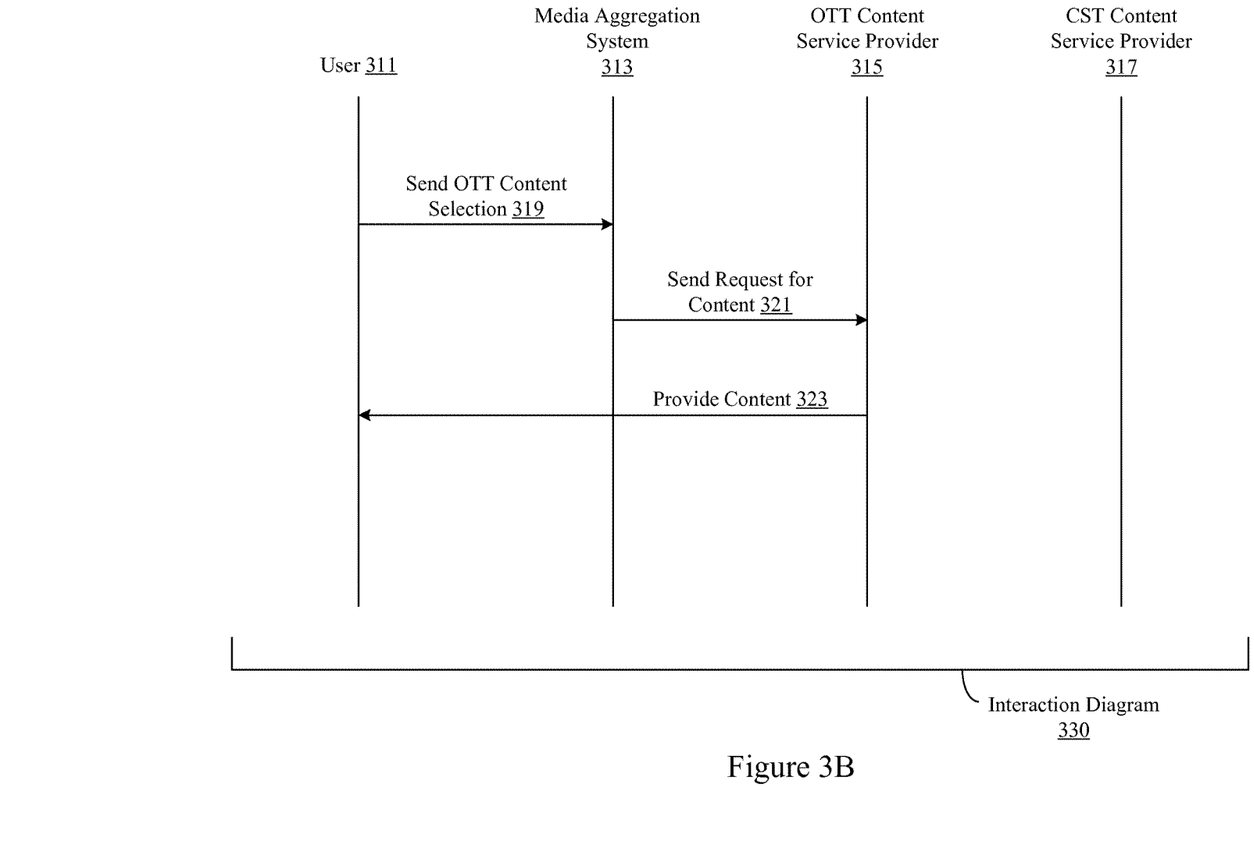
FIG. 3B illustrates one example of an interaction diagram showing a process used to provide OTT content to a user.

FIGS. 3A and 3B provide examples of processes that can be used to provide over-the-top (OTT) content to a user. With particular reference to FIG. 3A, shown is one example of a process that can be used to provide OTT content to a user. In this example, a selection of OTT content is received from a user at 301. For instance, a user can select a piece of OTT content from a playlist such as a unified playlist. Some examples of unified playlists from which a user can select content are shown and described below with regard to FIGS. 5 and 6. These unified playlists can allow the user to select desired content directly from a single unified playlist and play the content on the same screen without the need to separately interact with any additional app, service, provider, etc. When the user selects a piece of OTT content, the user's selection is sent to the media aggregation system.

In the present example, receipt of the user's selection triggers the media aggregation system to send a transmission request to the OTT content service provider at 303. The user is then provided with access to the OTT content at 305. According to various embodiments, the user is provided with a seamless experience, such that the user can select and play content via a unified playlist without having to launch a separate application, service, etc.

With reference to FIG. 3B, shown is one example of an interaction diagram showing a process used to provide OTT content to a user. In particular, interaction diagram 330 shows a user 311, media aggregation system 313, OTT content service provider 315, and CST content service provider 317. When a user 311 wants to watch content, the user 311 makes a selection from a unified playlist provided by media aggregation system 313. In the present example, the user 311 selects OTT content. This OTT content selection is sent at 319 to media aggregation system 313. Receipt of this OTT content selection at media aggregation system 313 triggers media aggregation system 313 to send a request for content at 321 to OTT content service provider 315. In response, OTT content service provider 315 can provide content 323 to user 311. As shown in this example, OTT content service provider 315 can provide the content directly to user 311, such as through streaming video or other content. According to various embodiments, the content can be provided seamlessly to user 311 via a user interface provided by media aggregation system 313. For instance, if the user clicks on a play button or thumbnail shown in a unified playlist, such as in FIG. 5 or 6 below, the content can begin to play. If the content is stopped or otherwise ends, the unified playlist can be displayed again. Accordingly, it may look to the user 311 that the content is playing directly through the unified playlist. In an alternative embodiment, not shown, the requested content can be stored at the media aggregation system 313, such as on a DVR associated with the media aggregation system 313. In this alternative embodiment, the content can be provided by the media aggregation system 313 to the user, without having to involve the OTT content service provider 315. Either way, the user interface viewed by user 311 can appear the same, as though the user is interacting only with the unified playlist.

Figure 4A:
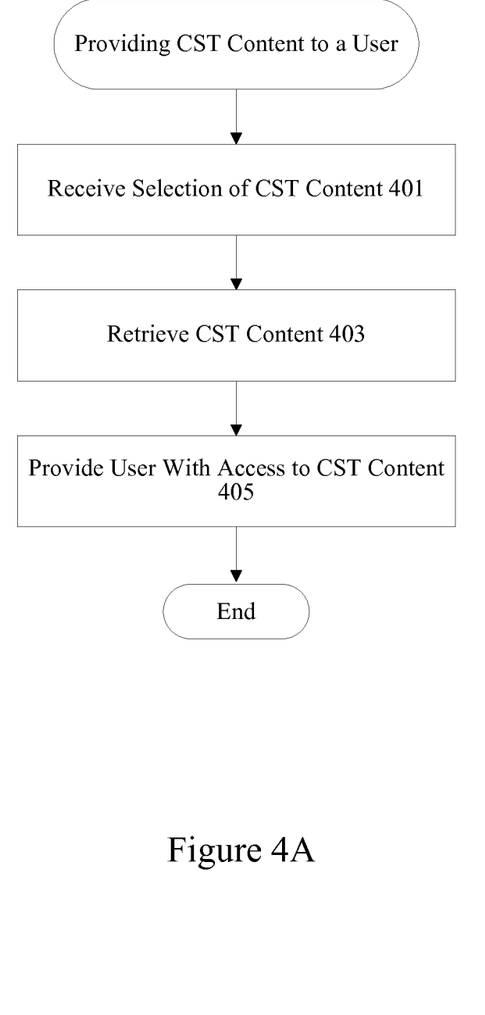
FIG. 4A illustrates one example of a process that can be used to provide cable/satellite/terrestrial (CST) content to a user.
Figure 4B:
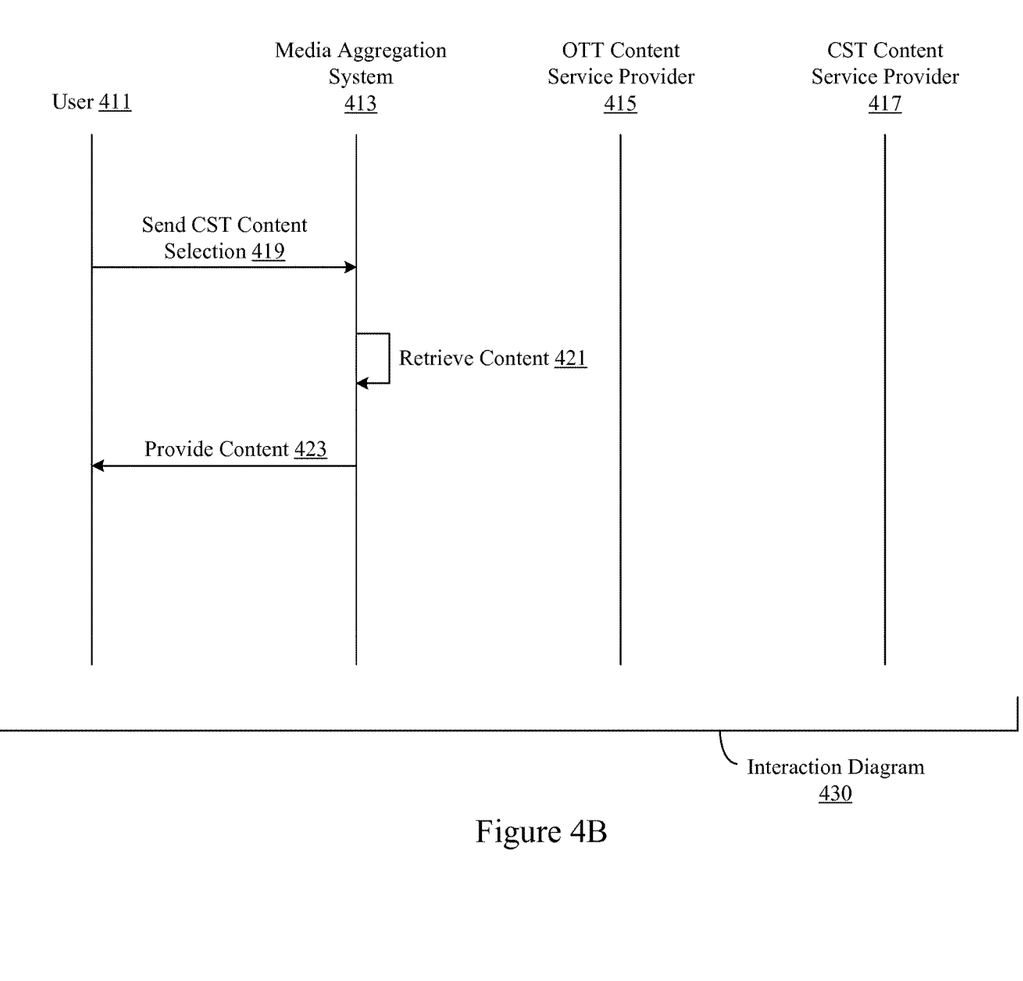
FIG. 4B illustrates one example of an interaction diagram showing a process used to provide CST content to a user.

FIGS. 4A and 4B provide examples of processes that can be used to provide cable/satellite/terrestrial (CST) content to a user. With reference to FIG. 4A, shown is one example of a process that can be used to provide CST content to a user. In this example, a selection of CST content is received from a user at 301. For instance, a user can select a piece of CST content from a playlist such as a unified playlist. Some examples of unified playlists from which a user can select content are shown and described below with regard to FIGS. 5 and 6. These unified playlists can allow the user to select desired content directly from a single unified playlist and play the content on the same screen without the need to separately interact with any additional app, service, provider, etc. When the user selects a piece of CST content, the user's selection is sent to the media aggregation system.

In the present example, receipt of the user's selection triggers the media aggregation system to retrieve CST content at 403. For instance, the media aggregation system can retrieve the content from a digital video recorder (DVR) associated with the media aggregation system. In other embodiments, the content can be retrieved from the CST content service provider, such as through a DVR associated with the CST content service provider, or as live streaming. In yet other examples, the media aggregation system can retrieve the content from a third party storage location. The user is then provided with access to the CST content at 405. According to various embodiments, the user is provided with a seamless experience, such that the user can select and play content via a unified playlist without having to launch a separate application, service, etc.

With reference to FIG. 4B, shown is one example of an interaction diagram showing a process used to provide CST content to a user. In particular, interaction diagram 430 shows a user 411, media aggregation system 413, OTT content service provider 415, and CST content service provider 417. When a user 411 wants to watch content, the user 411 can make a selection from a unified playlist provided by media aggregation system 413. In the present example, the user 411 selects CST content. This CST content selection is sent at 419 to media aggregation system 413. Receipt of this CST content selection at media aggregation system 413 triggers media aggregation system 313 to retrieve content at 421. As shown, the media aggregation system 413 can retrieve content internally from a storage device such as a DVR. The media aggregation system 413 can then provide the retrieved content at 423 to user 411. According to various embodiments, the content can be provided seamlessly to user 411 via a user interface provided by media aggregation system 413. For instance, if the user clicks on a play button or thumbnail shown in a unified playlist, such as in FIG. 5 or 6 below, the content can begin to play. If the content is stopped or otherwise ends, the unified playlist can be displayed again. Accordingly, it may look to the user 411 that the content is playing directly through the unified playlist. In alternative embodiments, not shown, the requested content may be provided directly by CST content service provider 417 to user 411.

Figure 5:
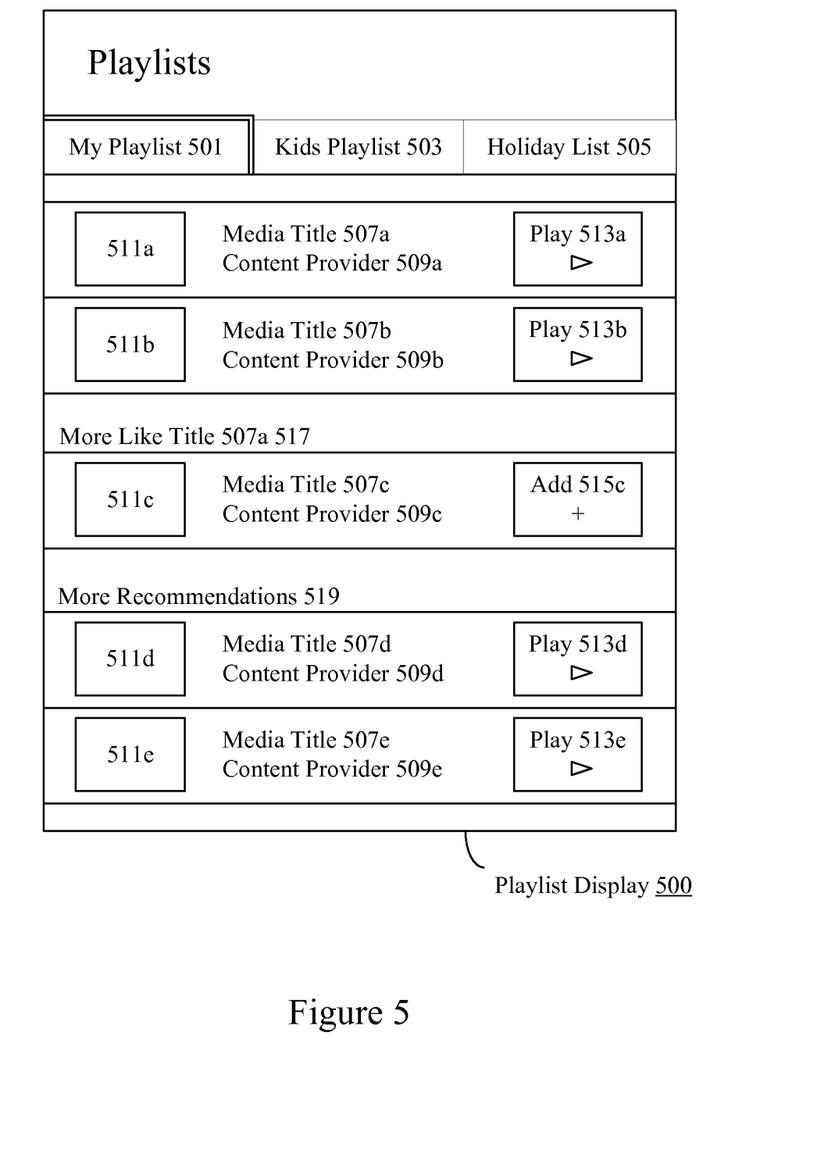
FIG. 5 illustrates one example of playlist display that includes a unified playlist.
Figure 6:
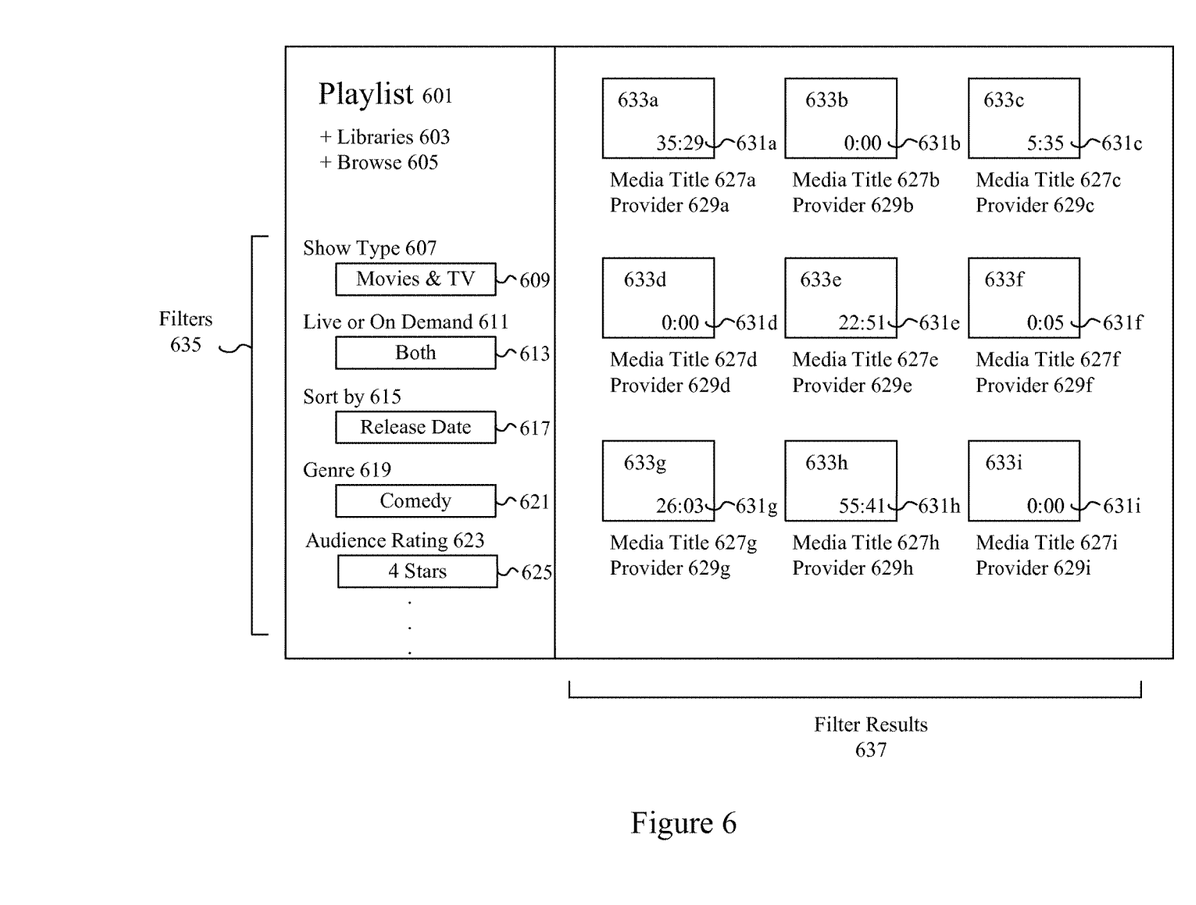
FIG. 6 illustrates one example of a unified playlist that includes filters.

Various configurations of user interfaces can be used to provide unified playlists, within the scope of the present disclosure. FIGS. 5 and 6 illustrate a couple of examples of user interfaces that include unified playlists. As described above, a unified playlist can include information about media content from different providers in a single list. Furthermore, a unified playlist can provide a single interface through which a user can browse and play media content from these different providers.

With reference to FIG. 5, shown is one example of a playlist display that includes a unified playlist. In the present example, the playlist display 500 includes various playlist tabs 501, 503, and 505. Although three tabs are shown, any number of tabs can be included. The playlist tabs 501, 503, and 505 can be used to organize media content. According to various embodiments, a user or different users using the same account can customize playlists based on their viewing preferences. In addition, if multiple users are connected to an HDMI accessory, all of these users can have access to view and modify the one or more playlists.

In the present embodiment, each of the playlists associated with the playlist tabs 501, 503, and 505, respectively, can be considered unified playlists. More particularly, each unified playlist can include media content from multiple services and/or applications that can be watched on a display such as a TV screen, monitor, smartphone, etc. Specifically, one playlist can include media content from multiple content providers. A user can add selected media content to one or more playlists and can also play the media content from these playlists.

As shown in the present example, a playlist tab 501, named "My Playlist," is active on the playlist display 500. Thumbnails 511a and 511b can show images, icons, video clips, etc. representing media content associated with media titles 507a and 507b, respectively. These media titles 507a and 507b can be associated with a movie, TV show, or other content. The content providers 509a and 509b, respectively, are listed below the media titles. For instance, 511a could show a thumbnail image from the show "Seinfeld," media title 507a could be listed as "Seinfeld," and the content provider 509a could be listed as Comcast. In this same example, 511b could show a thumbnail image from the movie "Jurassic Park," media title 507b could be listed as "Jurassic Park," and the content provider 509b could be listed as Hulu.

According to various embodiments, each of the playlist items can include an associated play button 513a and 513b, respectively. When a user presses, clicks, or otherwise selects a play button, the associated media content will start playing on the user's screen, without the user having to launch any additional application, service, etc. When the media content is stopped, either by the user or automatically at the end of the movie, show, sports event, etc., the playlist display 500 can be shown again. In this manner, the user can be provided with a seamless experience of viewing and playing content from the unified playlists on the playlist display 500, regardless of which content provider is supplying the content or what type of content (i.e. live, on-demand, TV, movie, sports event, etc.) is selected.

According to various embodiments, suggestions for additional media content can be provided on the playlist display 500. In some instances, suggestions can be made based on items in a user's current playlist. As shown, the section entitled "More Like Title 507*a*" 517 can include a suggestion for media title 507*c* from content provider 509*c* based on the user's inclusion of media title 507*a* in a playlist. In the example previously described, media title 507*a* could be listed as "Seinfeld," and the suggested media title 507*c* could be listed as "Friends." The suggested media title 507*c* can be listed along with a thumbnail 511*c* and a content provider 509*c*. As shown, an add button 515*c* can also be included in case the user wants to add the title to their playlist 501. If the media title is a series or TV show, various episodes could be added to the playlist or an option to select particular episodes, new episodes, all episodes, etc. can be included. In some instances, if the media title is a movie or other feature, a single piece of media content may be added to the playlist 501.

Additional suggestions for media content can be included as "More Recommendations" 519, as shown in the present example. In some examples, these additional suggestions can be based on user activity, playlists, preferences, etc. In other examples, these additional suggestions can be based on what is popular, new, etc. with other viewers, etc. In yet other examples, a combination of these suggestions can be included. In addition, these additional suggestions can be any type of content from any of the content providers available.

As shown on the playlist display 500, two pieces of media content are presented as suggestions in the "More Recommendations" 519 section. These two pieces each include a media title 507*d* and 507*e*, respectively, from content providers 509*d* and 509*e*, respectively. The suggested media titles 507*d* and 507*e* can be listed along with thumbnails 511*d* and 511*e*, respectively, and play buttons 513*d* and 513*e*, respectively. In the present example, these media titles can be played without being added to the playlist. However, in some embodiments, if a user plays one of the media titles, future suggestions may be based on this user selection. Alternatively, an add button can be included in case the user wants to add the title to their playlist, an example of which is shown in the "More Like Title 507*a*" section. In some implementations, movies, episodes, etc. can include a play button, whereas a series, etc. can include an add button. However, a play button, add button, etc. can be featured with any media title, depending on the implementation.

With reference to FIG. 6, shown is another example of a user interface that includes a unified playlist. In this example, the unified playlist provides a universal feed that allows users to simultaneously browse and/or search content from different content providers that is accessible through a media aggregation system. This combined content provided by the media aggregation system can include OTT streaming libraries such as Hulu and Vudu, DVR-recorded content, CST content, and any other content accessible to the media aggregation system. In the present example, the unified program listing is searchable and browseable. Furthermore, one or more filters can be used to view the unified program listing. For instance, users can apply filters 635 to this feed using a variety of options including, but not limited to, show type 607, live vs. on demand 611, release date 617 (or air time for live TV), genre 619, audience rating 623, library 603, parental rating (not shown), and whether the user has watched the content yet (not shown).

In the present example, playlist 601 may include a particular library of content selected from libraries 603, such as favorite shows, a particular user's playlist, a customized category, etc. For instance, playlist 601 could be shown as "Sam's playlist" instead of "Playlist." Other playlists may be found by selecting the libraries 603 plus sign or link. Browse 605 may include all content available from all providers in some instances. If browse 605 is selected, playlist 601 could be shown as "All content" instead of "Playlist." Similarly, any subset of available content can be searched or browsed. Although not shown in the figure, a search box can be included that allows a user to search for a specific media title, etc.

In the present embodiment, filters 635 are shown to allow a user to prune the space of search results. As shown, the show type 607 is toggled to movies and TV 609, live or on-demand 611 is toggled to both 613, sort by 615 is toggled to release date 617, genre 619 is toggled to comedy 621, and audience rating 623 is toggled to 4 stars 625. Of course, any number or combination of filter categories can be included depending on the application, as shown by the dots following below the audience rating.

As shown, the filter results 637 are shown in a panel to the right of the user interface. Thumbnails 633*a-i* include timestamps 631*a-i*, which can designate where the media title will start playing if selected. For instance, for thumbnail 633*a*, the media title 627*a* will begin playing at 35:29 (minutes:seconds) if selected and played from this saved location. In one example, if viewing of a first piece of CST content is interrupted, the rest of the first piece of CST content can recorded for later viewing. In this case, CST content can be saved to the playlist and will begin playing from where viewing was interrupted when selected. According to various embodiments, the thumbnails can be an image, icon, video clip, etc. In the present example, each thumbnail is associated with a media title 627*a-i* and provider 629*a-i*. The sort order in the present example is based on release date, so the thumbnails and associated information can be sorted in from newest to oldest, or vice versa.

In the present example, a user can play content from the unified playlist by selecting a particular media title. For instance, a user can click or otherwise select a thumbnail, play button (not shown), link, etc. associated with a particular item. For instance, if the user wants to play media title 627*a*, the user can click or otherwise select the thumbnail 633*a* or if the media title 627*a* is featured as a clickable link, the user can alternatively select this link. If selected, the media title can begin playing without the user having to launch any other application or service. If the media title is stopped, the user can be brought back to the last user interface provided, such as that shown in FIG. 6.

As described above with regard to FIGS. 5 and 6, unified playlists can be presented in different ways, within the scope of the present disclosure. As such, various user interfaces can be provided that include a unified playlist. In another example, a user interface can include a panel that plays content automatically from a user's playlist. This panel can be part of a display on a unified playlist screen, etc. In some embodiments, content from the unified playlist can be automatically played when the media aggregation system is launched.

According to various embodiments, a user interface associated with the media aggregation system, such as a playlist interface, can include a panel that plays content automatically or samples content from a title that the user is browsing. In previously existing systems, when a user turns on their TV, arbitrary live content may begin playing automatically. Because users habitually browse live TV because it starts playing automatically, users often miss out on other content that is available to them. In previous systems, the content that plays automatically is not personalized and is generally limited to live content. The user must manually navigate to and select OTT or DVR-recorded content before it begins playing.

However, according to various embodiments of the present disclosure, an autoplaying smart feed can personalize the content that begins playing automatically when a user launches the media aggregation system. A personalization algorithm can pull from any content to which the user has access whether it is live or on-demand content, and regardless of the content provider. In addition, the smart feed can play from a user's unified playlist, new episodes associated with the user's unified playlist, or from suggested content based on the user's unified playlist. By using an autoplaying smart feed, users can start consuming content that is most likely to appeal to them, without requiring the user to actively browse or search content, or launch multiple applications, services, etc. to find content that they are likely to enjoy.

Figure 7:
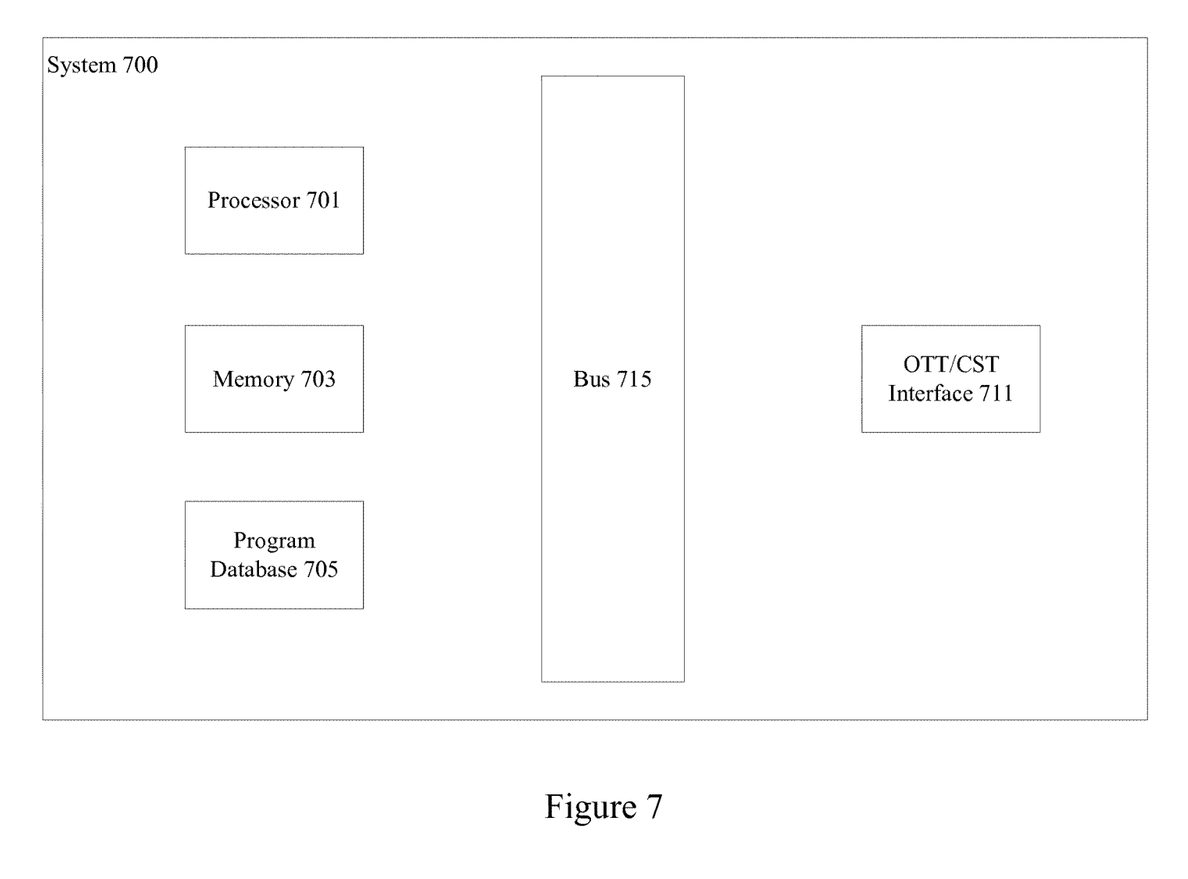
FIG. 7 illustrates an example of a system.

With reference to FIG. 7, shown is one example of a server. According to particular embodiments, a system 700 suitable for implementing particular embodiments of the present disclosure includes a processor 701, a memory 703, an interface 711, and a bus 715 (e.g., a PCI bus or other interconnection fabric). Various specially configured devices can also be used in place of a processor 701 or in addition to processor 701. Program database 705 may be configured to maintain a unified playlist. The interface 711 can be configured to send and receive data packets or data segments over a network to an OTT or CST. According to one example embodiment, system 700 can be used to implement a media aggregation system. In some embodiments, various content service providers can also use a system such as system 700 to implement their operations.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 700 is a server that also includes a transceiver, streaming buffers, and a program guide database. The server may also be associated with subscription management, logging and report generation, and monitoring capabilities. In particular embodiments, the server can be associated with functionality for allowing operation with mobile devices such as cellular phones operating in a particular cellular network and providing subscription management capabilities. According to various embodiments, an authentication module verifies the identity of devices including mobile devices. A logging and report generation module tracks mobile device requests and associated responses. A monitor system allows an administrator to view usage patterns and system availability. According to various embodiments, the server handles requests and responses for media content related transactions while a separate streaming server provides the actual media streams.

Although a particular server is described, it should be recognized that a variety of alternative configurations are possible. For example, some modules such as a report and logging module and a monitor may not be needed on every server. Alternatively, the modules may be implemented on another device connected to the server. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method comprising:
   sending a connection request from a media aggregation system to an over-the-top (OTT) content service provider;
   establishing a connection between the media aggregation system and the OTT content service provider;
   establishing a connection between the media aggregation system and a cable/satellite/terrestrial (CST) content service provider, wherein the OTT content service provider and the CST content service providers are different providers;
   generating a unified playlist at the media aggregation system by combining program information from the OTT content service provider with program information associated with the CST content service provider, wherein the unified playlist is configured such that a user can discover live and on-demand content without accessing separate feeds, search live and on-demand content together instead of separately, and save and access movies and shows using only the unified playlist; and
   providing media content from multiple content providers directly through the unified playlist, without launching a separate application or service, even if different pieces of the media content are sourced from different content providers or repositories, wherein providing media content directly through the unified playlist includes:
      when a user selects a first media content from the unified playlist, the first media content begins to play directly from the playlist itself and when the user selects to pause the first media content, the unified playlist is automatically displayed again;
      wherein the unified playlist includes suggestions for content based on a combination of: the user's current playlist, user activity, preferences, and what is popular with other users;
      wherein the unified playlist displays and plays content from the OTT content service, CST content, and DVR recorded content within the same unified playlist.

2. The method of claim 1, wherein the unified playlist includes video on demand content and live content.

3. The method of claim 2, wherein live content is automatically saved using a digital video recorder (DVR) associated with the media aggregation system.

4. The method of claim 1, wherein the unified playlist includes OTT content, cable content, and terrestrial content transmitted over the air.

5. The method of claim 1, wherein selection of a piece of OTT content in the playlist triggers a transmission from the media aggregation system to the OTT content service provider.

6. The method of claim 1, wherein selection of a piece of CST content retrieves the content from a digital video recorder (DVR).

7. The method of claim 1, wherein the media aggregation system generates a unified program listing using program information from the OTT content service provider and program information associated with the CST content service provider.

8. The method of claim 7, wherein the unified program listing is searchable and browsable.

9. The method of claim 7, wherein a filter can be used to view the unified program listing.

10. The method of claim 1, wherein if viewing of a first piece of CST content is interrupted, the rest of the first piece of CST content is recorded for later viewing.

11. The method of claim 1, wherein a second connection request is sent from the media aggregation system to a second OTT content service provider.

12. The method of claim 11, wherein a connection is established between the media aggregation system and the second OTT content service provider.

13. The method of claim 12, wherein the unified playlist further includes program information from the second OTT content service provider.

14. The method of claim 1, further comprising automatically playing content from the unified playlist when the media aggregation system is launched.

15. The method of claim 1, further comprising playing content from the unified playlist at the request of a user.

16. A media aggregation system comprising:
- a network interface configured to send a connection request from a media aggregation system to an over-the-top (OTT) content service provider;
- a processor configured to establish a connection between the media aggregation system and the OTT content service provider, wherein the processor is further configured to establish a connection between the media aggregation system and a cable/satellite/terrestrial (CST) content service provider, wherein the OTT content service provider and the CST content service providers are different providers;
- a program database configured to maintain a unified playlist at the media aggregation system by combining program information from the OTT content service provider with program information associated with the CST content service provider, wherein the unified playlist is configured such that a user can discover live and on-demand content without accessing separate feeds, search live and on-demand content together instead of separately, and save and access movies and shows using only the unified playlist;
- wherein the processor is further configured to provide, via the program database, media content from multiple content providers directly through the unified playlist, without launching a separate application or service, even if different pieces of the media content are sourced from different content providers or repositories, wherein providing media content directly through the unified playlist includes:
  - when a user selects a first media content from the unified playlist, the first media content begins to play directly from the playlist itself and when the user selects to pause the first media content, the unified playlist is automatically displayed again;
  - wherein the unified playlist includes suggestions for content based on a combination of: the user's current playlist, user activity, preferences, and what is popular with other users;
  - wherein the unified playlist displays and plays content from the OTT content service, CST content, and DVR recorded content within the same unified playlist.

17. The media aggregation system of claim 16, wherein the unified playlist includes video on demand content and live content.

18. The media aggregation system of claim 17, wherein live content is automatically saved using a digital video recorder (DVR) associated with the media aggregation system.

19. The media aggregation system of claim 16, wherein the unified playlist includes OTT content, cable content, and terrestrial content transmitted over the air.

20. The media aggregation system of claim 16, wherein selection of a piece of OTT content in the playlist triggers a transmission from the media aggregation system to the OTT content service provider.

* * * * *